United States Patent
Hammad et al.

(10) Patent No.: US 10,069,161 B2
(45) Date of Patent: Sep. 4, 2018

(54) IN-SITU GRAVITATIONAL SEPARATION OF ELECTROLYTE SOLUTIONS IN FLOW REDOX BATTERY SYSTEMS

(71) Applicant: Saudi Arabian Oil Company, Dhahran (SA)

(72) Inventors: Ahmad D. Hammad, Dhahran (SA); Stamatios Souentie, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 142 days.

(21) Appl. No.: 15/072,912

(22) Filed: Mar. 17, 2016

(65) Prior Publication Data
US 2017/0271703 A1 Sep. 21, 2017

(51) Int. Cl.
*H01M 8/18* (2006.01)
*H01M 8/20* (2006.01)

(52) U.S. Cl.
CPC ............ *H01M 8/188* (2013.01); *H01M 8/20* (2013.01)

(58) Field of Classification Search
CPC ............................... H01M 8/188; H01M 8/20
See application file for complete search history.

(56) References Cited

U.S. PATENT DOCUMENTS

| | | |
|---|---|---|
| 2010/0323264 A1 | 12/2010 | Chiang et al. |
| 2011/0117411 A1 | 5/2011 | Horne et al. |
| 2011/0200848 A1 | 8/2011 | Chiang et al. |
| 2012/0135278 A1 | 5/2012 | Yoshie et al. |
| 2013/0011702 A1 | 1/2013 | Horne et al. |
| 2014/0134465 A1 | 5/2014 | Kumamoto et al. |

FOREIGN PATENT DOCUMENTS

CN 103618094 A 3/2014

OTHER PUBLICATIONS

Jia et al., "High-energy density nonaqueous all redox flow lithium battery enabled with a polymeric membrane", Science Advances, vol. 1, No. 10, Nov. 27, 2015.*
C.Jia et al; "High-Energy density nonaqueous all redox flow lithium battery enabled with a polymeric membrane", Science Advances, vol. 1, No. 10, Nov. 27, 2015.

(Continued)

Primary Examiner — Brittany Raymond
(74) Attorney, Agent, or Firm — Dinsmore & Shohl, LLP (57) ABSTRACT

A flow redox battery system including an electrochemical cell, an anolyte tank, a catholyte tank, a first anolyte carrier slurry, a second anolyte carrier slurry, a first catholyte carrier slurry, a second catholyte carrier slurry, and a power generation circuit. An ion-exchange membrane is electrochemically engaged with an anode and a cathode. The power generation circuit is electrically coupled to the anode and the cathode. The anolyte tank is fluidly coupled to the anode and the catholyte tank is fluidly coupled to the cathode. The first anolyte carrier slurry includes a density less than a density of the second anolyte carrier slurry and an electronegativity different than an electronegativity of the second anolyte carrier slurry. Further, the first catholyte carrier slurry includes a density less than a density of the second catholyte carrier slurry and an electronegativity different than an electronegativity of the second catholyte carrier slurry.

19 Claims, 3 Drawing Sheets

(56) References Cited

OTHER PUBLICATIONS

Mihai Duduta et al; "Semi-Solid Lithium Rechargeable Flow Battery", Advanced Energy Materials, vol. 1, No. 4, Jul. 20, 2011.
International Search Report dated May 29, 2017, PCT Application No. PCT/US2017/022092, Saudi Arabian Oil Company.
Knehr et al., "Open Circuit Voltage of Vanadium Redox Flow Batteries: Discrepancy Between Models and Experiments", Electrochemistry Communications, Jan. 31, 2011, 342-345, 13, Elsevier.
Leung et al., "Progess in Redox Flow Batteries, Remaining Challenges and Their Applications in Energy Storage", RSC Advances, 2012, 10125-10156, 2.
Parasuraman et al., "Review of Material Research and Development for Vanadium Redox Flow Battery Applications", Electrochimica Acta, 2013, 27-40, 101.
Yang et al., "Performance Modeling of a Vanadium Redox Flow Battery during Discharging", Electrochimica Acta, 2015, 279-287, 155.
Prifti et al., "Membranes for Redox Flow Battery Applications", Membranes, 2012, 275-306, 2.
Blanc et al., "Understanding the Vanadium Redox Flow Batteries", Paths to Sustainable Energy, 2010, 333-358, Intech.

* cited by examiner

IN-SITU GRAVITATIONAL SEPARATION OF ELECTROLYTE SOLUTIONS IN FLOW REDOX BATTERY SYSTEMS

BACKGROUND

The present disclosure relates to flow redox battery systems. More specifically, the present disclosure introduces technology for flow redox battery systems that include electrolyte carrier slurries.

BRIEF SUMMARY

According to the subject matter of the present disclosure, a flow redox battery system includes an electrochemical cell, an anolyte tank, a catholyte tank, a first anolyte carrier slurry, a second anolyte carrier slurry, a first catholyte carrier slurry, a second catholyte carrier slurry, and a power generation circuit. The electrochemical cell includes an ion-exchange membrane positioned between and electrochemically engaged with an anode and a cathode. The power generation circuit is electrically coupled to the anode and the cathode. The anolyte tank comprises an anolyte upper end fluidly coupled to the anode and an anolyte lower end fluidly coupled to the anode. The catholyte tank includes a catholyte upper end fluidly coupled to the cathode and a catholyte lower end fluidly coupled to the cathode. The first anolyte carrier slurry includes a density that is less than a density of the second anolyte carrier slurry and an electronegativity that is different than an electronegativity of the second anolyte carrier slurry. Further, the first catholyte carrier slurry includes a density that is less than a density of the second catholyte carrier slurry and an electronegativity that is different than an electronegativity of the second catholyte carrier slurry.

In accordance with one embodiment of the present disclosure, a flow redox battery system includes an electrochemical cell, an anolyte tank, a catholyte tank, a first anolyte carrier slurry, a second anolyte carrier slurry, a first catholyte carrier slurry, a second catholyte carrier slurry, an anolyte solution, a catholyte solution, and a power generation circuit. The electrochemical cell includes an ion-exchange membrane positioned between and electrochemically engaged with an anode and a cathode. The power generation circuit is electrically coupled to the anode and the cathode. The anolyte tank includes an anolyte upper end fluidly coupled to the anode and an anolyte lower end fluidly coupled to the anode. The catholyte tank includes a catholyte upper end fluidly coupled to the cathode and a catholyte lower end fluidly coupled to the cathode. The anolyte solution is chemically engageable with the first anolyte carrier slurry and the second anolyte carrier slurry. The catholyte solution is chemically engageable with the first catholyte carrier slurry and the second catholyte carrier slurry. The first anolyte carrier slurry includes a density that is less than a density of the second anolyte carrier slurry and an electronegativity that is different than an electronegativity of the second anolyte carrier slurry. The first catholyte carrier slurry includes a density that is less than a density of the second catholyte carrier slurry and an electronegativity that is different than an electronegativity of the second catholyte carrier slurry. Further, the first and second anolyte carrier slurries and the first and second catholyte carrier slurries each comprise a plurality of slurry grains, each slurry grain comprising an inert core and one or more active particles chemically engaged with the inert core.

In accordance with another embodiment of the present disclosure, a flow redox battery system includes an electrochemical cell, an anolyte tank, a catholyte tank, a first anolyte carrier slurry, a second anolyte carrier slurry, a first catholyte carrier slurry, a second catholyte carrier slurry, and a power generation circuit. The electrochemical cell includes an ion-exchange membrane positioned between and electrochemically engaged with an anode and a cathode. The power generation circuit is electrically coupled to the anode and the cathode. The anolyte tank includes an anolyte upper end fluidly coupled to the anode and an anolyte lower end fluidly coupled to the anode. The catholyte tank includes a catholyte upper end fluidly coupled to the cathode and a catholyte lower end fluidly coupled to the cathode. The first anolyte carrier slurry includes a density that is less than a density of the second anolyte carrier slurry such that the first anolyte carrier slurry floats above the second anolyte carrier slurry when the first and second anolyte carrier slurries are housed within the anolyte tank. The first anolyte carrier slurry includes an electronegativity that is greater than an electronegativity of the second anolyte carrier slurry such that the first anolyte carrier slurry electrochemically attracts a discharged anolyte active material and the second anolyte carrier slurry electrochemically attracts a charged anolyte active material. The first catholyte carrier slurry includes a density that is less than a density of the second catholyte carrier slurry such that the first catholyte carrier slurry floats above the second catholyte carrier slurry when the first and second catholyte carrier slurries are housed within the catholyte tank. Further, the first catholyte carrier slurry includes an electronegativity that is less than the electronegativity of the second catholyte carrier slurry such that the first catholyte carrier slurry electrochemically attracts a discharged catholyte and the second catholyte carrier slurry electrochemically attracts a charged catholyte active material.

Although the concepts of the present disclosure are described herein with primary reference to some specific flow redox battery system configurations, it is contemplated that the concepts will enjoy applicability to flow redox battery systems having any configuration.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
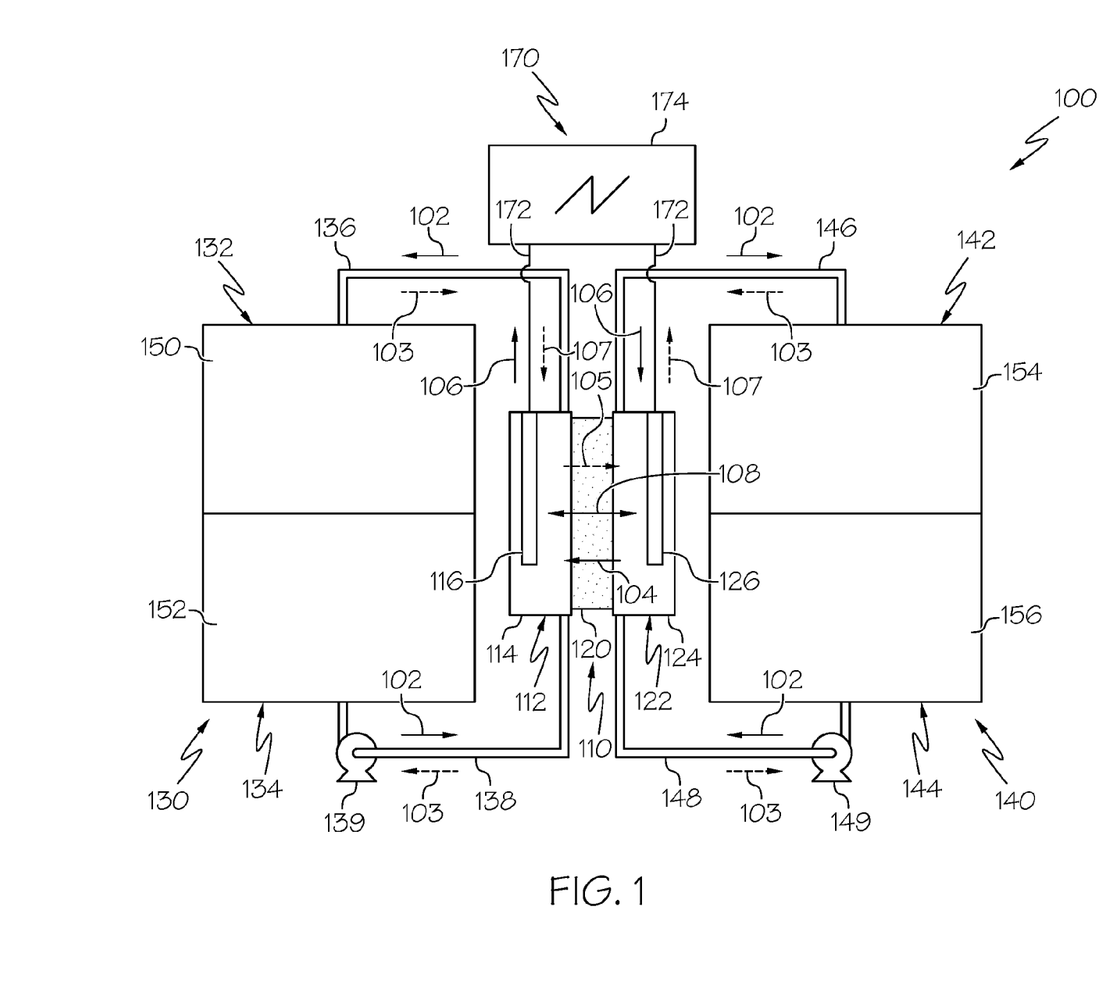
FIG. 1 is a schematic illustration of a flow redox battery system according to one or more embodiments shown and described herein.

FIG. 1 is a schematic illustration of a flow reduction/oxidation (redox) battery system 100. The flow redox battery system 100 comprises an electrochemical cell 110, an anolyte tank 130, a catholyte tank 140, and a power generation circuit 170. The electrochemical cell 110 is fluidly coupled to the anolyte tank 130 and the catholyte tank 140 and is electrically coupled to the power generation circuit 170. The flow redox battery system 100 comprises a first anolyte carrier slurry 150 and a second anolyte carrier slurry 152, which may each be housed within the anolyte tank 130 and may each flow between the anolyte tank 130 and the electrochemical cell 110. The flow redox battery system 100 also comprises a first catholyte carrier slurry 154 and a second catholyte carrier slurry 156, which may each be housed within the catholyte tank 140 and may each flow between the catholyte tank 140 and the electrochemical cell 110. Moreover, the flow redox battery system 100 includes electrolyte solutions such as an anolyte solution and a catholyte solution.

The anolyte solution may be housed within the anolyte tank 130 and may flow between the anolyte tank 130 and the electrochemical cell 110. The anolyte solution may comprise a plurality of charged anolyte active materials, a plurality of discharged anolyte active materials, or combinations thereof and is compositionally configured to oxidize at the electrochemical cell 110 during a discharging operation of the flow redox battery system 100 and reduce at the electrochemical cell 110 during a charging operation of the flow redox battery system 100. As used herein, "active material" refers to a chemical component such as an atom, ion, molecule, or the like, that is compositionally configured to change oxidation states when undergoing a redox reaction. For example, it is contemplated that the active materials of the anolyte solution may comprise vanadium, chromium, zinc, sulfur, neptunium, uranium, or a combination thereof. Moreover, each of the plurality of charged anolyte active materials comprise a lower positive charge and a lower oxidation state than each of the plurality of discharged anolyte active materials.

The catholyte solution may be housed within the catholyte tank 140 and may flow between the catholyte tank 140 and the electrochemical cell 110. The catholyte solution may comprise a plurality of charged catholyte active materials, a plurality of discharged catholyte active materials, or combinations thereof and is compositionally configured to reduce at the electrochemical cell 110 during the discharging operation and oxidize at the electrochemical cell 100 during the charging operation. Each of the plurality of charged catholyte active materials comprise a higher positive charge and a higher oxidation state than each of the plurality of discharged catholyte active materials. For example, it is contemplated that the active materials of the catholyte solution may comprise vanadium, bromine, cerium, chlorine, ferricyanide, ferrocyanide, manganese, neptunium oxide, uranium oxide, or a combination thereof.

Further, the anolyte solution and catholyte solution may each comprise any active material having redox pairs which exhibit different standard reduction potentials. Further, the anolyte solution may comprise an active material with a lower standard reduction than the active material of the catholyte solution. The table below depicts a non-exhaustive list of active material redox pairs that may be used as the catholyte solution and the analyte solution.

| Catholyte Solution Active Materials | Anolyte Solution Active Materials |
|---|---|
| $Cr^{3+}/Cr^{2+}$ | $Fe^{3+}/F^{2+}$ |
| $V^{3+}/V^{2+}$ | $V^{5+}/V^{4+}$ |

-continued

| Catholyte Solution Active Materials | Anolyte Solution Active Materials |
|---|---|
| $V^{3+}/V^{2+}$ | $Br_2/Br-$ |
| $V^{3+}/V^{2+}$ | $Fe^{3+}/F^{2+}$ |
| $V^{3+}/V^{2+}$ | $Ce^{4+}/Ce^{3+}$ |
| $Zn^{2+}/Zn$ | $Cl-/Cl_2$ |
| $Zn^{2+}/Zn$ | $Br-/Br_2$ |
| $Zn^{2+}/Zn$ | $Ce^{4+}/Ce^{3+}$ |
| $Zn^{2+}/Zn$ | $V^{5+}/V^{4+}$ |
| $Zn^{2+}/Zn$ | $[Fe(CN)_6]^{4-}/[Fe(CN)_6]^{3-}$ |
| $V^{3+}/V^{2+}$ | $Ce^{4+}/Ce^{3+}$ |
| $V^{3+}/V^{2+}$ | $Mn^{3+}/Mn^{2+}$ |
| $S_2^{2-}/S_4^{2-}$ | $Br^-/Br_3^-$ |
| $Np^{4+}/Np^{3+}$ | $NpO_2^+/NpO_2^{2+}$ |
| $U^{4+}/U^{3+}$ | $UO_2^+/UO_2^{2+}$ |

As depicted in FIG. 1, the electrochemical cell 110 comprises an ion-exchange membrane 120 positioned between and electrochemically engaged with an anode 112 and a cathode 122. The anode 112 includes an anode conductive portion 116 electrically coupled to the power generation circuit 170 such that electrons may flow between the anode 112 and the power generation circuit 170. The anode 112 also includes an anolyte receiving portion 114 fluidly coupled to the anolyte tank 130 such that the first and second anolyte carrier slurries 150, 152 and the anolyte solution may flow between the anolyte tank 130 and the anolyte receiving portion 114 of the anode 112. When the anolyte solution is located within the anolyte receiving portion 114, the anolyte solution may electrochemically contact the ion-exchange membrane 120 and the anode conductive portion 116.

The cathode 122 includes a cathode conductive portion 126 electrically coupled to the power generation circuit 170 such that electrons may flow between the cathode 122 and the power generation circuit 170. The cathode 122 also includes a catholyte receiving portion 124 fluidly coupled to the catholyte tank 140 such that the first and second catholyte carrier slurries 156, 158 and the catholyte solution may flow between the catholyte tank 140 and the catholyte receiving portion 124 of the cathode 122. When the catholyte solution is located within the catholyte receiving portion 124, the catholyte solution may electrochemically contact the ion-exchange membrane 120 and the cathode conductive portion 126.

The ion-exchange membrane 120 may comprise a solid state proton conducting material, for example, Nafion®, Nation® 117, Flemion®, Fumapem®, Aciplex®, Dow® materials, Selemion®, TPS®, Gore® L01854, Gore® M04494, ABT3, ABT4, SZ, Hipore®, SPEEK, Nafion®/SPEEK, PSSS, SPTK, Radel®, PVDF-PSSA, ETFE-PD-MAEMA, SPEEK/TPA, TPA/PP, SPEEK/PTFE, SPEEK/PFSA, PBI, PSf-ABIm, polybenzimidazole, polyether polymer, or the like. The ion-exchange membrane 120 is positioned within the electrochemical cell 110 and may provide a physical barrier between the anolyte receiving portion 114 of the anode 112 and the catholyte receiving portion 124 of the cathode 122. Further, the ion-exchange membrane 120 is structurally configured to provide a proton pathway 108 between the anode 112 and the cathode 122 such that protons may flow therebetween to facilitate oxidation and reduction reactions within the anode 112 and the cathode 122 during the discharging operation and the charging operation of the flow redox battery system 100.

Further, the proton pathway 108 of the ion-exchange membrane 120 may close a circuit between the anode 112, the power generation circuit 170, and the cathode 122 such that oxidation and reduction reactions may generate electron flow between the anode 112 and the cathode 122 and through the power generation circuit 170, and may generate proton flow between the anode 112 and the cathode 122 and through the ion-exchange membrane 120. For example, during the discharging operation, protons may traverse the proton pathway 108 provided by the ion-exchange membrane 120 in a proton discharging flow direction 104 from the cathode 122 to the anode 112 and during the charging operation, protons may traverse the proton pathway 108 of the ion-exchange membrane 120 in a proton charging flow direction 105 from the anode 112 to the cathode 122.

Referring still to FIG. 1, the power generation circuit 170 comprises a power generation unit 174. The circuit pathway 172 is electrically coupled to the anode 112, the power generation unit 174 and the cathode 122. For example, the circuit pathway 172 may extend between and electrically couple the anode 112 and the power generation unit 174 and the circuit pathway may extend between and electrically coupled the cathode 122 and the power generation unit 174. The power generation unit 174 may comprise a power source and an electrical load. The power generation unit 174 is structurally configured to receive current generated by electrons output by the anode 112 and, upon receiving current, generate power. The power generation unit 174 is also structurally configured to output current receivable by the anode 112 to charge the anolyte solution and the catholyte solution.

The first anolyte carrier slurry 150 and the second anolyte carrier slurry 152 are each compositionally configured to attract active materials of an anolyte solution and chemically engage the active materials of the anolyte solution. For example, the first anolyte carrier slurry 150 may be compositionally configured to attract and chemically engage one of the plurality of discharged or charged anolyte active materials and the second anolyte carrier slurry 152 may be compositionally configured to attract and chemically engage the other of the plurality of discharged or charged anolyte active materials, for example, to separate the pluralities of charged and discharged anolyte active materials within the anolyte tank 130.

Further, the first catholyte carrier slurry 154 and the second catholyte carrier slurry 156 are each compositionally configured to attract active materials of the catholyte solution and chemically engage the catholyte solution. For example, the first catholyte carrier slurry 154 may be compositionally configured to attract and chemically engage one of the plurality of discharged or charged catholyte active materials and the second catholyte carrier slurry 156 may be compositionally configured to attract and chemically engage the other of the plurality of discharged or charged catholyte active materials, for example, to separate the pluralities of charged and discharged catholyte active materials.

Figure 2:
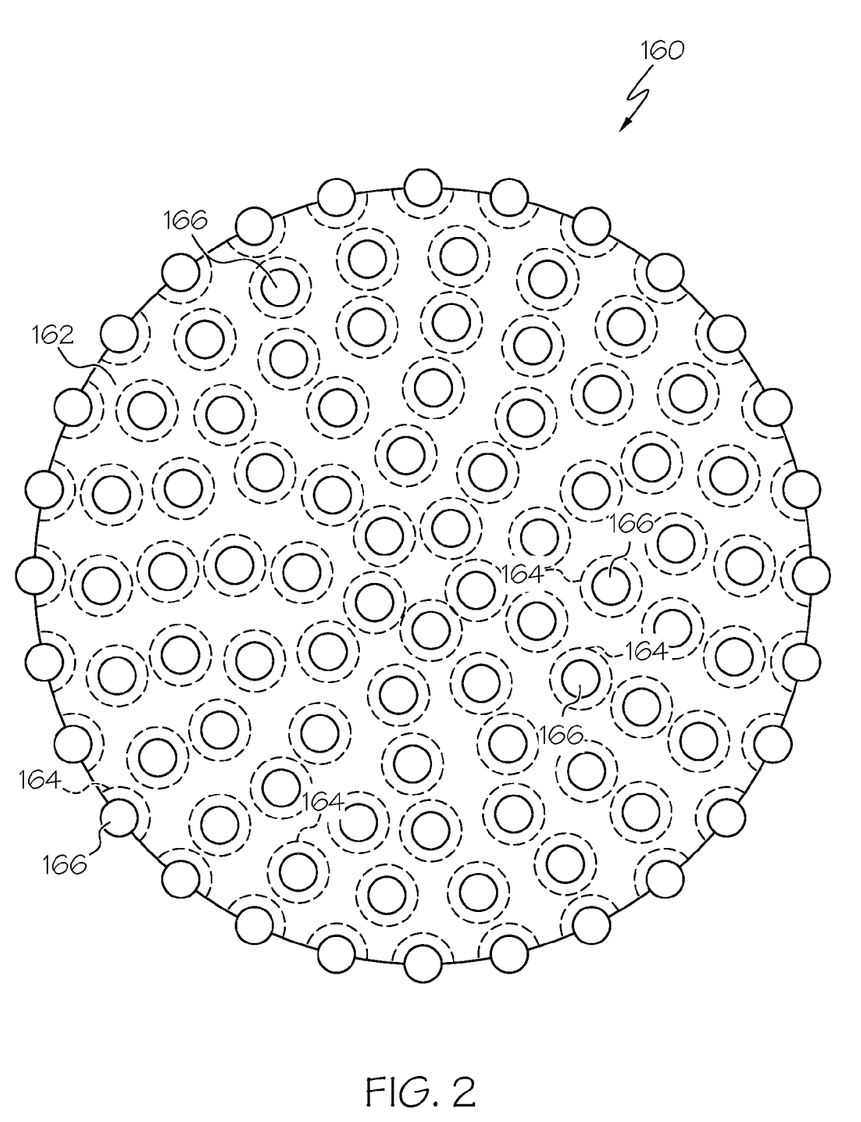
FIG. 2 is schematic illustration of an example slurry grain of an anolyte carrier slurry or a catholyte carrier slurry according to one or more embodiments shown and described herein.

Referring now to FIG. 2, the first and second anolyte carrier slurries 150, 152 and the first and second catholyte carrier slurries 154, 156 of FIG. 1 may each comprise a plurality of slurry grains 160. Each slurry grain 160 includes an inert core 162 and one or more active particles 166 chemically engaged with the inert core 162. The inert core 162 may comprise an organic particle, an inorganic particle, or a combination thereof. For example, it is contemplated that the inert core 162 may comprise alumina, silica, silicon carbide, zirconia, ceria, a polymer particle, a single metal oxide, a mixed metal oxide, or a combination thereof. The inert core 162 of the slurry grains 160 of the first anolyte carrier slurry 150 may have a lower density than the inert core 162 of the slurry grains 160 of the second anolyte carrier slurry 152, such that the first anolyte carrier slurry 150 may float above the second anolyte carrier slurry 152. Further, the inert core 162 of the slurry grains 160 of the first catholyte carrier slurry 154 may have a lower density than the inert core 162 of the slurry grains 160 of the second catholyte carrier slurry 156, such that the first catholyte carrier slurry 154 may float above the second catholyte carrier slurry 156.

As depicted in FIG. 2, the slurry grains 160 further comprise one or more functionalized surface regions 164 positioned along the surface of the inert core 162 and one or more active particles 166 chemically engaged with the inert core 162 at the one or more functionalized surface regions 164. The functionalized surface regions 164 may be chemically configured to bond with one or more functional groups of the active particles 166, for example, using a functionalization method such as a chemo-functionalization method. It is contemplated that the one or more active particles 166 may comprise a metal, for example, Cu, a metal oxide, for example, $ZrO_2$, a mixed metal, for example, Cu—Zn, a mixed metal oxide, for example, $TiO_2$—$ZrO_2$, a doped metal, for example, $Y_2O_3$—$ZrO_2$, or a combination thereof. Further, the one or more active particles 166 are compositionally configured to attract and chemically engage the discharged or charged catholyte active materials and the discharged or charged anolyte active materials. Moreover, the one or more active particles 166 of the first anolyte carrier slurry 150 may comprise a different electronegativity the one or more active particles 166 of the second carrier slurry 152 and the one or more active particles 166 of the first catholyte carrier slurry 154 may comprise a different electronegativity than the one or more active particles 166 the second catholyte carrier slurry 156.

Referring again to FIG. 1, the first and second anolyte carrier slurries 150, 152 are immiscible such that the first and second anolyte carrier slurries 150, 152 separate when housed within anolyte tank 130. Further, the first anolyte carrier slurry 150 comprises a density that is less than a density of the second anolyte carrier slurry 152 such that the first anolyte carrier slurry 150 floats above the second anolyte carrier slurry 152 when the first and second anolyte carrier slurries 150, 152 are housed within the anolyte tank 130. Moreover, the first anolyte carrier slurry 150 comprises an electronegativity that is different than an electronegativity of the second anolyte carrier slurry 152 such that one of the first and second anolyte carrier slurries 150, 152 electrochemically attract the charged anolyte active materials of the anolyte solution and the other of the first and second anolyte carrier slurries 150, 152 electrochemically attracts the discharged anolyte active materials of the anolyte solution.

For example, the electronegativity of the first anolyte carrier slurry 150 may be greater than the electronegativity of the second anolyte carrier slurry 152 such that the first anolyte carrier slurry 150 electrochemically attracts the plurality of discharged anolyte active materials, the second anolyte carrier slurry 152 electrochemically attracts the plurality of charged anolyte active materials, and the plurality of discharged anolyte active materials float above the plurality of charged anolyte active materials. Moreover, the electronegativity of the first anolyte carrier slurry 150 may be less than the electronegativity of the second anolyte carrier slurry 152 such that the first anolyte carrier slurry 150 electrochemically attracts the plurality of charged anolyte active materials, the second anolyte carrier slurry 152 electrochemically attracts the plurality of discharged anolyte active materials, and the plurality of charged anolyte active materials float above the plurality of discharged anolyte active materials.

The first and second catholyte carrier slurries 154, 156 are immiscible such that the first and second catholyte carrier slurries 154, 156 separate when housed within catholyte tank 140. Further, the first catholyte carrier slurry 154 comprises a density that is less than a density of the second catholyte carrier slurry 156 such that the first catholyte carrier slurry 154 floats above the second catholyte carrier slurry 156 when the first and second catholyte carrier slurries 154, 156 are housed within the catholyte tank 140. Moreover, the first catholyte carrier slurry 154 comprises an electronegativity that is different than an electronegativity of the second catholyte carrier slurry 156 such that one of the first and second catholyte carrier slurries 154, 156 electrochemically attract the charged catholyte active materials of the catholyte solution and the other of the first and second catholyte carrier slurries 154, 156 electrochemically attracts the discharged catholyte active materials of the catholyte solution.

For example, the electronegativity of the first catholyte carrier slurry 154 may be greater than the electronegativity of the second catholyte carrier slurry 156 such that the first catholyte carrier slurry 154 electrochemically attracts the plurality of charged catholyte active materials, the second catholyte carrier slurry 156 electrochemically attracts the plurality of discharged catholyte, and the plurality of charged catholyte active materials float above the plurality of discharged catholyte active materials. Moreover, the electronegativity of the first catholyte carrier slurry 154 may be less than the electronegativity of the second catholyte carrier slurry 156 such that the first catholyte carrier slurry 154 electrochemically attracts the plurality of discharged catholyte active materials, the second catholyte carrier slurry 156 electrochemically attracts the plurality of charged catholyte active materials, and the plurality of discharged catholyte active materials float above the plurality of charged catholyte active materials.

Referring again to FIG. 1, the anolyte tank 130 comprises an anolyte upper end 132 and an anolyte lower end 134 each fluidly coupled to the anode 112. A low density anolyte pathway 136 extends between and fluidly couples the anolyte upper end 132 of the anolyte tank 130 and the anode 112 and a high density anolyte pathway 138 extends between and fluidly couples the anolyte lower end 134 of the anolyte tank 130 and the anode 112. The low density anolyte pathway 136 and the high density anolyte pathway 138 each comprise a tube, pipe or other fluid pathway mechanism. An anolyte pump 139 is fluidly coupled to one of the low density anolyte pathway 136 or the high density anolyte pathway 138. The anolyte pump 139 comprises any fluid pumping mechanism and is structurally configured to generate fluid flow between the anolyte tank 130 and the anode 112. While the anolyte pump 139 depicted in FIG. 1 is fluidly coupled to the low density anolyte pathway 136, the anolyte pump 139 may be fluidly coupled to the high density anolyte pathway 138 or multiple anolyte pumps 139 may be fluidly coupled to one or both of the low density anolyte pathway 136 or the high density anolyte pathway 138.

The catholyte tank 140 comprises a catholyte upper end 142 and a catholyte lower end 144 each fluidly coupled to the cathode 122. A low density catholyte pathway 146 extends between and fluidly couples the catholyte upper end 142 of the catholyte tank 140 and the cathode 122 and a high density catholyte pathway 148 extends between and fluidly couples the catholyte lower end 144 of the catholyte tank 140 and the cathode 122. The low density catholyte pathway 146 and the high density catholyte pathway 148 may comprise a tube, or any other fluid pathway. A catholyte pump 149 fluidly coupled to one of the low density catholyte pathway 146 or the high density catholyte pathway 148. The catholyte pump 149 comprises any fluid pumping mechanism and is structurally configured to generate fluid flow between the catholyte tank 140 and the cathode 122. While the catholyte pump 149 depicted in FIG. 1 is fluidly coupled to the low density catholyte pathway 146, the catholyte pump 149 may be fluidly coupled to the high density catholyte pathway 148 or multiple catholyte pumps 149 may be coupled to one or both of the low density catholyte pathway 146 or the high density catholyte pathway 148.

Referring again to FIG. 1, during the discharging operation of the flow redox battery system 100, the anode 112 may receive a charged anolyte active material chemically engaged with the first or second anolyte carrier slurry 150, 152. The anode 112 may also receive a proton output by the cathode 122 from the proton pathway 108 formed by the ion-exchange membrane 120 to oxidize the charged anolyte active material and chemically separate the oxidized active material from the first or second anolyte carrier slurry 150, 152 at the anode 112. When oxidized, the charged anolyte active material outputs an electron receivable by the anode conductive portion 116 such that the electrons flow in an electron discharging direction 106 along the circuit pathway 172 to the power generation circuit 170. Moreover, after oxidation, the previously charged anolyte active material comprises a discharged anolyte active material and flows from the anode 112 back to the anolyte tank 130.

Further, during the discharging operation, when the first anolyte carrier slurry 150 is compositionally configured to attract and chemically engage discharged anolyte active materials and the second anolyte carrier slurry 152 is compositionally configured to attract and chemically engage charged anolyte active materials such that the discharged anolyte active materials float above the charged anolyte active materials, the anolyte pump 139 may generate fluid flow in a first flow direction 102 from the anolyte lower end 134 to the anode 112 and from the anode 112 to the anolyte upper end 132. Thus, the charged anolyte active materials chemically engaged with the higher density second anolyte carrier slurry 152 may flow along the high density anolyte pathway 138 in the first flow direction 102 from the anolyte lower end 134 to the anode 112 such that anode 112 fills with charged anolyte active materials compositionally configured to undergo oxidation and discharge.

After oxidation, the now discharged anolyte active materials may flow along the low density anolyte pathway 136 in the first flow direction 102 from the anode 112 to the anolyte upper end 132 such that the first anolyte carrier slurry 150 floating above the second anolyte carrier slurry 152 may attract and chemically engage the discharged anolyte active materials. Moreover, when the first anolyte carrier slurry 150 is compositionally configured to chemically attract and engage the charged anolyte active materials and the second anolyte carrier slurry 152 is compositionally configured to chemically attract and engage the discharged anolyte active materials such that the charged anolyte active materials float above the discharged anolyte active materials, the anolyte pump 139 may generate fluid flow in a second flow direction 103 from the anolyte upper end 132 to the anode 112 and from the anode 112 to the anolyte lower end 134.

During the discharging operation, the cathode 122 may receive a charged catholyte active material chemically engaged with the first or second catholyte carrier slurry 154, 156. The cathode 122 may also receive an electron from the power generation circuit 170 to reduce the charged catholyte active material and chemically separate the charged catholyte active material from the first or second catholyte carrier slurry 154, 156. When reduced, the charged catholyte active material outputs a proton receivable by the proton pathway 108 of the ion-exchange membrane 120 (for example, the proton received by the anode 112). Moreover, after reduction, the previously charged catholyte active material comprises a discharged catholyte active material and flows from the cathode 122 back to the catholyte tank 140.

Further, during the discharging operation, when the first catholyte carrier slurry 154 is compositionally configured to attract and chemically engage discharged catholyte active materials and the second catholyte carrier slurry 156 is compositionally configured to attract and chemically engage charged catholyte active materials such that the discharged anolyte active materials float above the charged catholyte active materials, the catholyte pump 149 may generate fluid flow in the first flow direction 102 from the catholyte lower end 144 to the cathode 122 and from the cathode 122 to the catholyte upper end 142. Thus, the charged catholyte active materials chemically engaged with the higher density second catholyte carrier slurry 156 may flow along the high density catholyte pathway 148 in the first flow direction 102 from the catholyte lower end 144 to the cathode 122, such that cathode 122 fills with charged catholyte active materials compositionally configured to undergo reduction and discharge.

After reduction, the now discharged catholyte active material may flow along the low density catholyte pathway 146 in the first flow direction 102 from the cathode 122 to the catholyte upper end 142 such that the first catholyte carrier slurry 154 floating above the second catholyte carrier slurry 156 may attract and chemically engage the discharged catholyte active material. Moreover, when the first catholyte carrier slurry 154 is compositionally configured to attract and chemically engage the charged catholyte active materials and the second catholyte carrier slurry 156 is compositionally configured to attract and chemically engage the discharged catholyte active materials such that the charged catholyte active materials float above the charged catholyte active materials, the catholyte pump 149 may generate fluid flow in the second flow direction 103 from the catholyte upper end 142 to the cathode 122 and from the cathode 122 to the catholyte lower end 144.

Referring still to FIG. 1, during the charging operation of the flow redox battery system 100, the anode 112 may receive the discharged anolyte active material chemically engaged with the first or second anolyte carrier slurry 150, 152. The anode 112 may also receive an electron from the power generation circuit 170 to reduce the discharged anolyte active material and chemically separate the discharged anolyte active material from the first or second anolyte carrier slurry 150, 152. When reduced, the discharged anolyte active material outputs a proton receivable by the proton pathway 108 of the ion-exchange membrane 120. Moreover, after reduction, the previously discharged anolyte active material comprises a charged anolyte active material and flows from the anode 112 back to the anolyte tank 130.

Further, during the charging operation, when the first anolyte carrier slurry 150 is compositionally configured to attract and chemically engage discharged anolyte active materials and the second anolyte carrier slurry 152 is compositionally configured to attract and chemically engage charged anolyte active materials such that the discharged anolyte active materials float above the charged anolyte active materials, the anolyte pump 139 may generate fluid flow in the second flow direction 103 from the anolyte upper end 132 to the anode 112 and from the anode 112 to the anolyte lower end 134. Thus, the discharged anolyte active materials chemically engaged with the lower density first anolyte carrier slurry 150 may flow along the low density anolyte pathway 136 in the second flow direction 103 from the anolyte upper end 132 to the anode 112, such that anode 112 fills with discharged anolyte active materials compositionally configured to undergo reduction and charge.

After reduction, the now charged anolyte active material may flow along the high density anolyte pathway 138 in the second flow direction 103 from the anode 112 to the anolyte lower end 134 such that the second anolyte carrier slurry 152 positioned below the first anolyte carrier slurry 150 may attract and chemically engage the charged anolyte active material. Moreover, when the first anolyte carrier slurry 150 is compositionally configured to attract and chemically engage the charged anolyte active material and the second anolyte carrier slurry 152 is compositionally configured to attract and chemically engage the discharged anolyte active materials such that the charged anolyte active materials float above the discharged anolyte active materials, the anolyte pump 139 may generate fluid flow in the first flow direction 102 from the anolyte upper end 132 to the anode 112 and from the anode 112 to the anolyte lower end 134.

During the charging operation, the cathode 122 may receive the discharged catholyte active material chemically engaged with the first or second catholyte carrier slurry 154, 156. The cathode 122 may also receive the proton output by the anode 112 from the proton pathway 108 formed by the ion-exchange membrane 120 to oxidize the discharged catholyte active material and chemically separate the oxidized active material from the first or second catholyte carrier slurry 154, 156 at the cathode 122. When oxidized, the discharged catholyte active material outputs an electron receivable by the cathode conductive port 126 such that the electrons flow in an electron charging direction 107 along the circuit pathway 172 to the power generation circuit 170. Moreover, after oxidation, the previously discharged catholyte active material comprises a charged catholyte active material and flows from the cathode 122 back to the catholyte tank 140.

Further, during the charging operation, when the first catholyte carrier slurry 154 is compositionally configured to attract and chemically engage discharged catholyte active materials and the second catholyte carrier slurry 156 is compositionally configured to attract and chemically engage charged catholyte active materials such that the discharged catholyte active materials float above the charged catholyte active materials, the catholyte pump 149 may generate fluid flow in the second flow direction 103 from the catholyte upper end 142 to the cathode 122 and from the cathode 122 to the catholyte lower end 144. Thus, the discharged catholyte active materials chemically engaged with the lower density first catholyte carrier slurry 154 may flow along the low density catholyte pathway 146 in the second flow direction 103 from the catholyte upper end 142 to the cathode 122, such that cathode 122 fills with discharged catholyte active materials compositionally configured to undergo oxidation and charge.

After oxidation, the now charged catholyte active material may flow along the high density catholyte pathway 148 in the second flow direction 103 from the cathode 122 to the catholyte lower end 144 such that the second catholyte carrier slurry 156 positioned below the first catholyte carrier slurry 154 may attract and chemically engage the charged catholyte active material. Moreover, when the first catholyte carrier slurry 154 is compositionally configured to attract and chemically engage the charged catholyte active materials and the second catholyte carrier slurry 156 is compositionally configured to attract and chemically engage the discharged catholyte active materials such that the charged catholyte active materials float above the charged catholyte active materials, the catholyte pump 149 may generate fluid flow in the first flow direction 102 from the catholyte upper end 142 to the cathode 122 and from the cathode 122 to the catholyte lower end 144.

In operation, an increased concentration of reactant anolyte active materials within the anode 112 and reactant catholyte active materials within the cathode 122 during operation of the electrochemical cell 110 decreases the electrochemical loss of the flow redox battery system 100. For example, when discharging the flow redox battery system 100, charged anolyte active materials are reactant anolyte active materials and charged catholyte active materials are reactant catholyte active materials and when charging the flow redox battery system 100, discharged anolyte active materials are the reactant anolyte active materials and discharged catholyte active materials are the reactant catholyte active materials. Accordingly, separating the charged and discharged anolyte active materials within the anolyte tank 130 and separating the charged and discharged catholyte active materials within catholyte tank 140 and selectively pumping reactant anolyte active materials into the anode 112 and reactant catholyte active materials into the cathode 122 may increase the efficiency of the flow redox battery system 100 by reducing electrochemical losses of the flow redox battery system 100.

For example, the flow redox battery system 100 comprises an open-circuit voltage $V_{OC}$ or electromotive force (EMF), which is the maximum voltage that may be generated by the flow redox battery system 100 under open-circuit conditions, for example, when there is zero current in the power generation circuit 170. The open-circuit voltage $V_{OC}$ is affected by the reduction and oxidation reactions at the electrochemical cell 110, the concentration of the reactant anolyte active materials in the anode 112 and reactant catholyte active materials in the cathode 122 (the Nernst voltage) and the operation temperature.

The open-circuit voltage $V_{OC}$ of the flow redox battery system 100 may be mathematically described as $$V_{OC} = V_{OC}^{\circ} + \frac{RT}{nF} \ln \frac{a_{ox}}{a_{red}}$$

where $V^{\circ}_{OC}$ is the reversible, maximum voltage between the anode 112 and the cathode 122, R is the universal gas constant, T is the operation temperature of the electrochemical cell 110, n is the number of moles of electrons transferred in the electrochemical cell 110 redox half-reactions, for example, the number of moles of electrons transferred between the anolyte solution and the catholyte solution along the circuit pathway 172, F is the Faraday constant, which is 96485 coulomb/mol, $a_{ox}$ is the activity of the oxidant species (for example, the anolyte solution during a discharging operation or the catholyte solution during the charging operation) and $a_{red}$ is the activity of the reductant species (for example, the anolyte solution during the charging operation or the catholyte solution during the discharging operation).

The activity ratio $$\frac{a_{ox}}{a_{red}}$$

changes when discharging or charging of the flow redox battery system 100. For example, the activity ratio is maximized at full charge. Further, the activity ratio decreases at a lower charge, because the concentration of the reactant active materials decreases and the concentration of the non-reactant active materials increases, which may decrease the open-circuit voltage $V_{OC}$. Accordingly, separating the charged and discharged anolyte and catholyte active materials in each of the anolyte and catholyte solutions may maximize the concentration of reactant active materials within the electrochemical cell 110 and increase the open-circuit voltage $V_{OC}$ of the flow redox battery system 100.

As an illustrative example, when the anolyte solution comprises vanadium, the plurality of charged anolyte active materials may each comprise $V^{2+}$ and the plurality of discharged anolyte active materials may each comprise $V^{3+}$. During the discharging operation, the oxidation reaction at the anode 112 may be chemically described as $V^{2+} \rightarrow V^{3+} + e^-$. At the anode 112, the charged anolyte active material $V^{2+}$ is oxidized into the discharged anolyte active material $V^{3+}$ and an electron $e^-$ is output into the circuit pathway 172 of the power generation circuit 170. The voltage generated the anode 112 at about 25° C. ($V^{\circ}_{anode,25\ C}$) may be about −0.26 V. Further, it should be understood that during the charging operation, the reduction reaction at the anode 112 may be chemically described as $V^{3+} + e^- \rightarrow V^{2+}$.

When the catholyte solution comprises vanadium, the plurality of charged catholyte active materials may each comprise $V^{5+}$ (for example, $VO_2^+$) and the plurality of discharged catholyte active material may each comprise $V^{4+}$ (for example, $VO^{2+}$). During the discharging operation, the reduction reaction at the cathode 122 may be chemically described as $VO_2^+ + e^- + 2H^+ \rightarrow VO^{2+} + H_2O$. At the cathode 122, the charged catholyte active material $V^{5+}$ ($VO_2^+$) is reduced into the discharged catholyte active material $V^{4+}$ ($VO^{2+}$) upon receipt of an electron $e^-$ from the circuit pathway 172 of the power generation circuit 170, for example, electron $e^-$ output by the anode 112 during the oxidation reaction. The voltage generated the cathode 122 at about 25° C. ($V^{\circ}_{cathode,25\ C}$) is equal to about 1.0 V. Further, it should be understood that during the charging operation, the reduction reaction at the cathode 122 may be chemically described as $VO^{2+} + H_2O \rightarrow VO_2^+ + e^- + 2H^+$.

Moreover, an electrode potential of the anode 112 ($V_{OC}^{anode}$) may be mathematically described as $$V_{OC}^{anode} = -0.26 + \frac{RT}{F} \ln \frac{[V^{3+}]}{[V^{2+}]}$$

and an electrode potential of the cathode 122 ($V_{OC}^{cathode}$) may be mathematically described as $$V_{OC}^{cathode} = 1 + \frac{RT}{F} \ln \frac{[VO_2^+][H^+]^2}{[VO^{2+}]}.$$

Thus, a total voltage of the electrochemical cell 110 ($V_{OC}^{cell}$) may be mathematically described as $$V_{OC}^{cell} = V_{OC}^{cathode} - V_{OC}^{anode} = 1.26 + \frac{RT}{F} \ln \frac{[VO_2^+][V^{2+}][H^+]^2}{[VO^{2+}][V^{3+}]},$$

where $[VO_2^+]$ is the concentration of charged catholyte active materials in the electrochemical cell 110, $[VO^{2+}]$ is the concentration of discharged catholyte active materials in the electrochemical cell 110, $[V^{2+}]$ is the concentration of charged anolyte active materials in the electrochemical cell 110, $[V^{3+}]$ is the concentration of discharged anolyte active materials in the electrochemical cell 110, and $[H^+]$ is the concentration of $H^+$ protons in the electrochemical cell 110.

The electrochemical cell 110 also comprises a Donnan overpotential $V_{Don}$, which is generated along the proton pathway 108 of the ion-exchange membrane 120 by the $H^+$ proton concentration difference between the anode 112 and the cathode 122. The Donnan overpotential may be mathematically described as $$V_{Don} = \frac{RT}{F} \ln \frac{[H^+]_{cathode}}{[H^+]_{anode}}$$

where $[H^+]_{cathode}$ is the concentration of $H^+$ protons in the cathode 122 and $[H^+]_{anode}$ is the concentration of $H^+$ protons in the anode 112. Accordingly, the overall open-circuit voltage of the flow redox battery system 100 ($V_{OC}^{cell}$) may be mathematically described as $$V_{OC}^{cell} = V_{OC}^{cathode} - V_{OC}^{anode} = 1.26 + \frac{RT}{F} \ln \frac{[VO_2^+][V^{2+}][H^+]_{cathode}^3}{[VO^{2+}][V^{3+}][H^+]_{anode}}.$$

Further, the amount of charge remaining within the flow redox battery system 100 is a state of charge (SOC) and may be mathematically represented by $$SOC = \frac{[V^{2+}]}{[V]} = \frac{[VO_2^+]}{[V]} = 1 - \frac{[VO^{2+}]}{[V]} = 1 - \frac{[VO^{3+}]}{[V]} = \frac{\Delta[H^+]}{[V]},$$

where $[V]$ is the vanadium concentration in the anolyte solution and catholyte solution, collectively, $\Delta[H^+]$ is the change in concentration of $H^+$ protons in the anode 112 or the cathode 122, for example, the difference between the original $H^+$ proton concentration and the current $H^+$ proton. Thus, the overall open-circuit voltage of the flow redox battery system 100 ($V_{OC}^{cell}$) may also be may also be mathematically represented with respect to the state of charge SOC, as $$V_{OC}^{cell} = 1.26 + \frac{RT}{F} \ln \frac{SOC^2([H^+]_{cathode}^O + [V]SOC)^3}{(1-SOC^2)([H^+]_{anode}^O + [V]SOC)}.$$

Separating the charged and discharged anolyte active materials and charged and discharged catholyte active materials within the anolyte tank 130 and the catholyte tank 140, respectively, may minimize the recirculation of the reactant active materials back to the anolyte tank 130 and the catholyte tank 140, respectively and minimize the amount of non-reactant active materials introduced into the electrochemical cell 110. This increases the open circuit voltage of the flow redox battery system 100 because the concentrations of the products reactant active materials may be constant during operation, as mathematically described by $[A^{\beta+}]=a[A^{\alpha+}]°$ and $[B^{\gamma+}]=a[B^{\delta+}]°$, where α is the percentage of the reactant active materials re-circulated back to the anolyte tank 130 and catholyte tank 140, respectively, and $[A^{\alpha+}]°$ and $[B^{\delta+}]°$ are the initial (full charge) concentration of the reactant active materials, respectively. Thus, the state of charge SOC may be mathematically described as $$SOC = \frac{[A^{\alpha+}]}{[A^{\alpha+}]°} = \frac{[B^{\delta+}]}{[B^{\delta+}]°}$$

and the open circuit voltage may be mathematically described as $$V_{OC} = V_{OC}^O + \frac{RT}{nF} \ln \frac{SOC^2([H^+]_{cathode}^O)^3}{a^2[H^+]_{anode}^O}.$$

Figure 3:
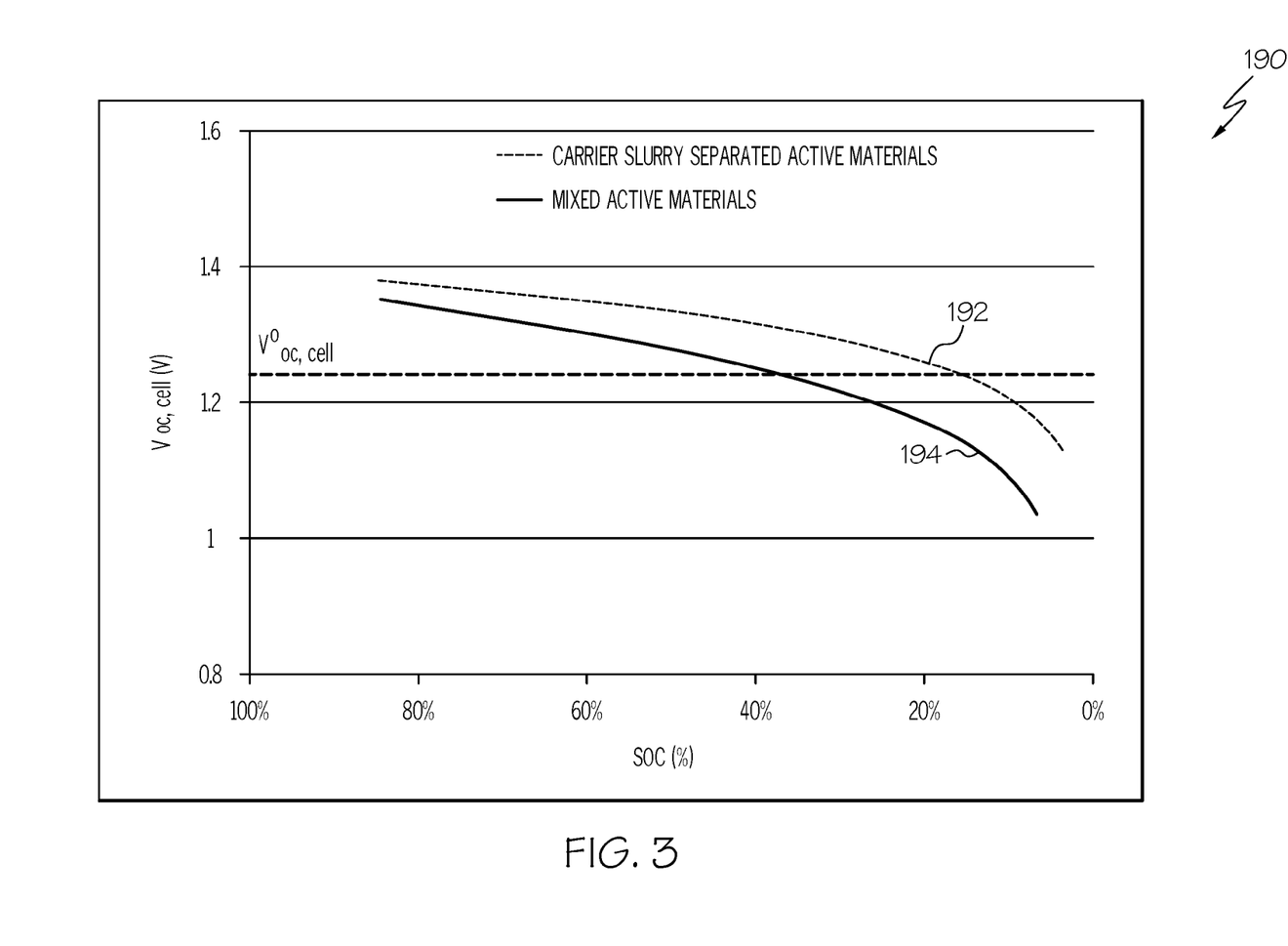
FIG. 3 is a graphical illustration of the open-circuit voltage over the state of charge percentage of the flow redox battery system of FIG. 1 according to one or more embodiments shown and described herein.

Referring now to FIG. 3, a graph 190 is depicted showing the open-circuit voltage ($V_{OC}^{cell}$) over the SOC percentage of the flow redox battery system 100. Curve 194, labeled "mixed active materials" depicts the open-circuit voltage ($V_{OC}^{cell}$) over the SOC percentage of the flow redox battery system 100 without the anolyte or catholyte carrier slurries 150, 152, 154, 156 such that the charged and discharged anolyte active materials are mixed within both the anolyte tank 130 and the anode 112 and the charged and discharged catholyte active materials are mixed within both the catholyte tank 140 and the cathode 122. Curve 192, labeled "carrier slurry separated active materials" depicts the open-circuit voltage ($V_{OC}^{cell}$) over the SOC percentage of the flow redox battery system 100 using anolyte and catholyte carrier slurries 150, 152, 154, 156 to separate the charged and discharged anolyte active materials within the anolyte tank 130 separate the charged and discharged catholyte active materials within the catholyte tank 140, as described supra. As depicted in FIG. 3, curve 192 shows a higher open circuit voltage ($V_{OC}^{cell}$) at every SOC percentage of the flow redox battery system 100 when compared to curve 194. Further, as the SOC percentage decreases, the gap between the open circuit voltage of curve 192 and curve 194 increases.

It is noted that recitations herein of a component of the present disclosure being "configured" in a particular way, to embody a particular property, or to function in a particular manner, are structural recitations, as opposed to recitations of intended use. More specifically, the references herein to the manner in which a component is "configured" denotes an existing physical condition of the component and, as such, is to be taken as a definite recitation of the structural characteristics of the component.

For the purposes of describing and defining the present invention it is noted that the term "about" is utilized herein to represent the inherent degree of uncertainty that may be attributed to any quantitative comparison, value, measurement, or other representation. The term "about" is also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A flow redox battery system comprising an electrochemical cell, an anolyte tank, a catholyte tank, a first anolyte carrier slurry, a second anolyte carrier slurry, a first catholyte carrier slurry, a second catholyte carrier slurry, and a power generation circuit, wherein:
   the electrochemical cell comprises an ion-exchange membrane positioned between and electrochemically engaged with an anode and a cathode;
   the power generation circuit is electrically coupled to the anode and the cathode;
   the anolyte tank comprises an anolyte upper end fluidly coupled to the anode and an anolyte lower end fluidly coupled to the anode;
   the catholyte tank comprises a catholyte upper end fluidly coupled to the cathode and a catholyte lower end fluidly coupled to the cathode;
   the first anolyte carrier slurry comprises a density that is less than a density of the second anolyte carrier slurry and an electronegativity that is different than an electronegativity of the second anolyte carrier slurry, wherein the first and second anolyte carrier slurries each comprise a plurality of slurry grains, each slurry grain comprising an inert core and one or more active particles chemically engaged with the inert core; and
   the first catholyte carrier slurry comprises a density that is less than a density of the second catholyte carrier slurry and an electronegativity that is different than an electronegativity of the second catholyte carrier slurry, wherein the first and second catholyte carrier slurries each comprise a plurality of slurry grains, each slurry grain comprising an inert core and one or more active particles chemically engaged with the inert core.

2. The flow redox battery system of claim 1, wherein the first anolyte carrier slurry floats above the second anolyte carrier slurry when the first and second anolyte carrier slurries are housed within the anolyte tank.

3. The flow redox battery system of claim 1, wherein the electronegativity of the first anolyte carrier slurry is greater than the electronegativity of the second anolyte carrier slurry such that the first anolyte carrier slurry electrochemically attracts a discharged anolyte active material and the second anolyte carrier slurry electrochemically attracts a charged anolyte active material.

4. The flow redox battery system of claim 1, wherein the electronegativity of the first anolyte carrier slurry is less than the electronegativity of the second anolyte carrier slurry such that the first anolyte carrier slurry electrochemically attracts a charged anolyte active material and the second anolyte carrier slurry electrochemically attracts a discharged anolyte active material.

5. The flow redox battery system of claim 1, wherein the first catholyte carrier slurry floats above the second catholyte carrier slurry when the first and second catholyte carrier slurries are housed within the catholyte tank.

6. The flow redox battery system of claim 1, wherein the electronegativity of the first catholyte carrier slurry is greater than the electronegativity of the second catholyte carrier slurry such that the first catholyte carrier slurry electrochemically attracts a charged catholyte active material and the second catholyte carrier slurry electrochemically attracts a discharged catholyte.

7. The flow redox battery system of claim 1, wherein the electronegativity of the first catholyte carrier slurry is less than the electronegativity of the second catholyte carrier slurry such that the first catholyte carrier slurry electrochemically attracts a discharged catholyte and the second catholyte carrier slurry electrochemically attracts a charged catholyte active material.

8. The flow redox battery system of claim 1, wherein the inert core comprises one or more functionalized surface regions and the one or more active particles are chemically engaged with the inert core at the one or more functionalized surface regions.

9. The flow redox battery system of claim 1, further comprising a low density anolyte pathway that extends between and fluidly couples the anolyte upper end of the anolyte tank and the anode and a high density anolyte pathway that extends between and fluidly couples the anolyte lower end of the anolyte tank and the anode.

10. The flow redox battery system of claim 1, further comprising a low density catholyte pathway that extends between and fluidly couples the catholyte upper end of the catholyte tank and the cathode and a high density catholyte pathway that extends between and fluidly couples the catholyte lower end of the catholyte tank and the cathode.

11. The flow redox battery system of claim 1, further comprising an anolyte solution chemically engageable with the first anolyte carrier slurry and the second anolyte carrier slurry.

12. The flow redox battery system of claim 11, wherein one or more active materials of the anolyte solution comprises vanadium, chromium, zinc, sulfur, neptunium, uranium, or a combination thereof.

13. The flow redox battery system of claim 11, wherein the anode is electrochemically configured to:
   chemically separate a charged anolyte active material from the first or second anolyte carrier slurry and oxidize the charged anolyte active material such that the charged anolyte active material outputs an electron receivable by the power generation circuit upon receiving both the charged anolyte active material chemically engaged with the first or second anolyte carrier slurry and a proton from the ion-exchange membrane; and
   chemically separate a discharged anolyte active material from the first or second anolyte carrier slurry and reduce the discharged anolyte active material such that the discharged anolyte active material outputs a proton receivable by the ion-exchange membrane upon receiving both the discharged anolyte active material chemically engaged with the first or second anolyte carrier slurry and an electron from the power generation circuit.

14. The flow redox battery system of claim 1, further comprising a catholyte solution chemically engageable with the first catholyte carrier slurry and the second catholyte carrier slurry.

15. The flow redox battery system of claim 14, wherein one or more active materials of the catholyte solution comprises vanadium, bromine, cerium, chlorine, ferricyanide, ferrocyanide, manganese, neptunium oxide, uranium oxide, or a combination thereof.

16. The flow redox battery system of claim 14, wherein the cathode is electrochemically configured to:
chemically separate a charged catholyte active material from the first or second catholyte carrier slurry and reduce the charged catholyte active material such that the charged catholyte active material outputs a proton receivable by the ion-exchange membrane upon receiving both the charged catholyte active material chemically engaged with the first or second catholyte carrier slurry and an electron from the power generation circuit; and
chemically separate a discharged catholyte active material from the first or second catholyte carrier slurry and oxidize the discharged catholyte active material such that the discharged catholyte active material outputs an electron receivable by the power generation circuit upon receiving both the discharged catholyte active material chemically engaged with the first or second catholyte carrier slurry and a proton from the ion-exchange membrane.

17. The flow redox battery system of claim 1, wherein the ion-exchange membrane comprises a solid state proton conducting material structurally configured to provide a proton pathway between the anode and the cathode.

18. A flow redox battery system comprising an electrochemical cell, an anolyte tank, a catholyte tank, a first anolyte carrier slurry, a second anolyte carrier slurry, a first catholyte carrier slurry, a second catholyte carrier slurry, an anolyte solution, a catholyte solution, and a power generation circuit, wherein:
the electrochemical cell comprises an ion-exchange membrane positioned between and electrochemically engaged with an anode and a cathode;
the power generation circuit is electrically coupled to the anode and the cathode;
the anolyte tank comprises an anolyte upper end fluidly coupled to the anode and an anolyte lower end fluidly coupled to the anode;
the catholyte tank comprises a catholyte upper end fluidly coupled to the cathode and a catholyte lower end fluidly coupled to the cathode;
the anolyte solution is chemically engageable with the first anolyte carrier slurry and the second anolyte carrier slurry;
the catholyte solution is chemically engageable with the first catholyte carrier slurry and the second catholyte carrier slurry;
the first anolyte carrier slurry comprises a density that is less than a density of the second anolyte carrier slurry and an electronegativity that is different than an electronegativity of the second anolyte carrier slurry;
the first catholyte carrier slurry comprises a density that is less than a density of the second catholyte carrier slurry and an electronegativity that is different than an electronegativity of the second catholyte carrier slurry; and
the first and second anolyte carrier slurries and the first and second catholyte carrier slurries each comprise a plurality of slurry grains, each slurry grain comprising an inert core and one or more active particles chemically engaged with the inert core.

19. A flow redox battery system comprising an electrochemical cell, an anolyte tank, a catholyte tank, a first anolyte carrier slurry, a second anolyte carrier slurry, a first catholyte carrier slurry, a second catholyte carrier slurry, and a power generation circuit, wherein:
the electrochemical cell comprises an ion-exchange membrane positioned between and electrochemically engaged with an anode and a cathode;
the power generation circuit is electrically coupled to the anode and the cathode;
the anolyte tank comprises an anolyte upper end fluidly coupled to the anode and an anolyte lower end fluidly coupled to the anode;
the catholyte tank comprises a catholyte upper end fluidly coupled to the cathode and a catholyte lower end fluidly coupled to the cathode;
the first anolyte carrier slurry comprises a density that is less than a density of the second anolyte carrier slurry such that the first anolyte carrier slurry floats above the second anolyte carrier slurry when the first and second anolyte carrier slurries are housed within the anolyte tank;
the first anolyte carrier slurry comprises an electronegativity that is greater than an electronegativity of the second anolyte carrier slurry such that the first anolyte carrier slurry electrochemically attracts a discharged anolyte active material and the second anolyte carrier slurry electrochemically attracts a charged anolyte active material, wherein the first and second anolyte carrier slurries each comprise a plurality of slurry grains, each slurry grain comprising an inert core and one or more active particles chemically engaged with the inert core;
the first catholyte carrier slurry comprises a density that is less than a density of the second catholyte carrier slurry such that the first catholyte carrier slurry floats above the second catholyte carrier slurry when the first and second catholyte carrier slurries are housed within the catholyte tank, wherein the first and second catholyte carrier slurries each comprise a plurality of slurry grains, each slurry grain comprising an inert core and one or more active particles chemically engaged with the inert core; and
the first catholyte carrier slurry comprises an electronegativity that is less than the electronegativity of the second catholyte carrier slurry such that the first catholyte carrier slurry electrochemically attracts a discharged catholyte and the second catholyte carrier slurry electrochemically attracts a charged catholyte active material.

* * * * *